United States Patent
Guislain et al.

(10) Patent No.: US 11,318,971 B2
(45) Date of Patent: May 3, 2022

(54) SYSTEM AND METHOD FOR TRACK OCCUPANCY DETERMINATION

(71) Applicant: SIEMENS AKTIENGESELLSCHAFT, Munich (DE)

(72) Inventors: Pierre-Olivier Guislain, Chevreuse (FR); Oscar Alonso Garrido, Tres Cantos (ES); Michael Gschnass, Braunschweig (DE)

(73) Assignee: Siemens Mobility GmbH, Munich (DE)

(*) Notice: Subject to any disclaimer, the term of this patent is extended or adjusted under 35 U.S.C. 154(b) by 628 days.

(21) Appl. No.: 16/324,234

(22) PCT Filed: Jun. 21, 2017

(86) PCT No.: PCT/EP2017/065169
§ 371 (c)(1),
(2) Date: Feb. 8, 2019

(87) PCT Pub. No.: WO2018/028864
PCT Pub. Date: Feb. 15, 2018

(65) Prior Publication Data
US 2019/0168791 A1    Jun. 6, 2019

(30) Foreign Application Priority Data
Aug. 8, 2016  (EP) .................................. 16183165

(51) Int. Cl.
*B61L 27/00* (2006.01)
*B61L 1/16* (2006.01)
(Continued)

(52) U.S. Cl.
CPC ........... *B61L 27/0077* (2013.01); *B61L 1/161* (2013.01); *B61L 1/162* (2013.01); *B61L 1/18* (2013.01);
(Continued)

(58) Field of Classification Search
CPC ............. B61L 27/0077; B61L 27/0005; B61L 27/0038; B61L 1/161; B61L 1/162;
(Continued)

(56) References Cited

U.S. PATENT DOCUMENTS

| | | | |
|---|---|---|---|
| 6,402,094 B1* | 6/2002 | Beer | B61L 25/026 246/122 R |
| 8,005,585 B2* | 8/2011 | Klemm | B61L 1/161 701/19 |
| 2019/0168791 A1* | 6/2019 | Guislain | B61L 27/0038 |

FOREIGN PATENT DOCUMENTS

| | | |
|---|---|---|
| CA | 2472637 A1 | 1/2005 |
| CN | 1299324 A | 6/2001 |

(Continued)

OTHER PUBLICATIONS

Chen Xin: "Analysis and Research of Three-point Inspection Technology on the Occupation Situation", Railway Computer Application, Dec. 31, 2015, vol. 24, Issue 10, pp. 6-9.

*Primary Examiner* — Jason C Smith
(74) *Attorney, Agent, or Firm* — Laurence A. Greenberg; Werner H. Stemer; Ralph E. Locher

(57) ABSTRACT

A method and a system determine a subsequent number of guided vehicles occupying a track section of a railway network. The system has a trackside device configured for controlling and managing a movement authority of a guided vehicle for a track section and at least one neighboring trackside device. Each neighboring trackside device is configured for controlling and managing a movement authority for a directly neighboring track section. The trackside device (Continued)

is configured for calculating the subsequent number of guided vehicles from a number of guided vehicles occupying the track section previously determined by the trackside device and information received from each neighboring trackside device regarding a number of guided vehicles entering, from the track section. The directly neighboring track section is controlled by the neighboring trackside device and a number of guided vehicles leaving the directly neighboring track section for the track section.

15 Claims, 1 Drawing Sheet

(51) Int. Cl.
*B61L 21/10* (2006.01)
*B61L 23/30* (2006.01)
*B61L 1/18* (2006.01)
*G06F 17/11* (2006.01)

(52) U.S. Cl.
CPC ............... *B61L 21/10* (2013.01); *B61L 23/30* (2013.01); *B61L 27/0005* (2013.01); *B61L 27/0038* (2013.01); *G06F 17/11* (2013.01)

(58) Field of Classification Search
CPC .. B61L 1/18; B61L 21/10; B61L 23/30; G06F 17/11
See application file for complete search history.

(56) References Cited

FOREIGN PATENT DOCUMENTS

| | | |
|---|---|---|
| CN | 1436135 A | 8/2003 |
| CN | 101445120 A | 6/2009 |
| CN | 204360686 U | 5/2015 |
| CN | 204750206 U | 11/2015 |
| CN | 105555636 A | 5/2016 |
| DE | 19706021 A1 | 8/1998 |
| DE | 102012217591 A1 | 3/2014 |
| EP | 2253525 A1 | 11/2010 |

* cited by examiner

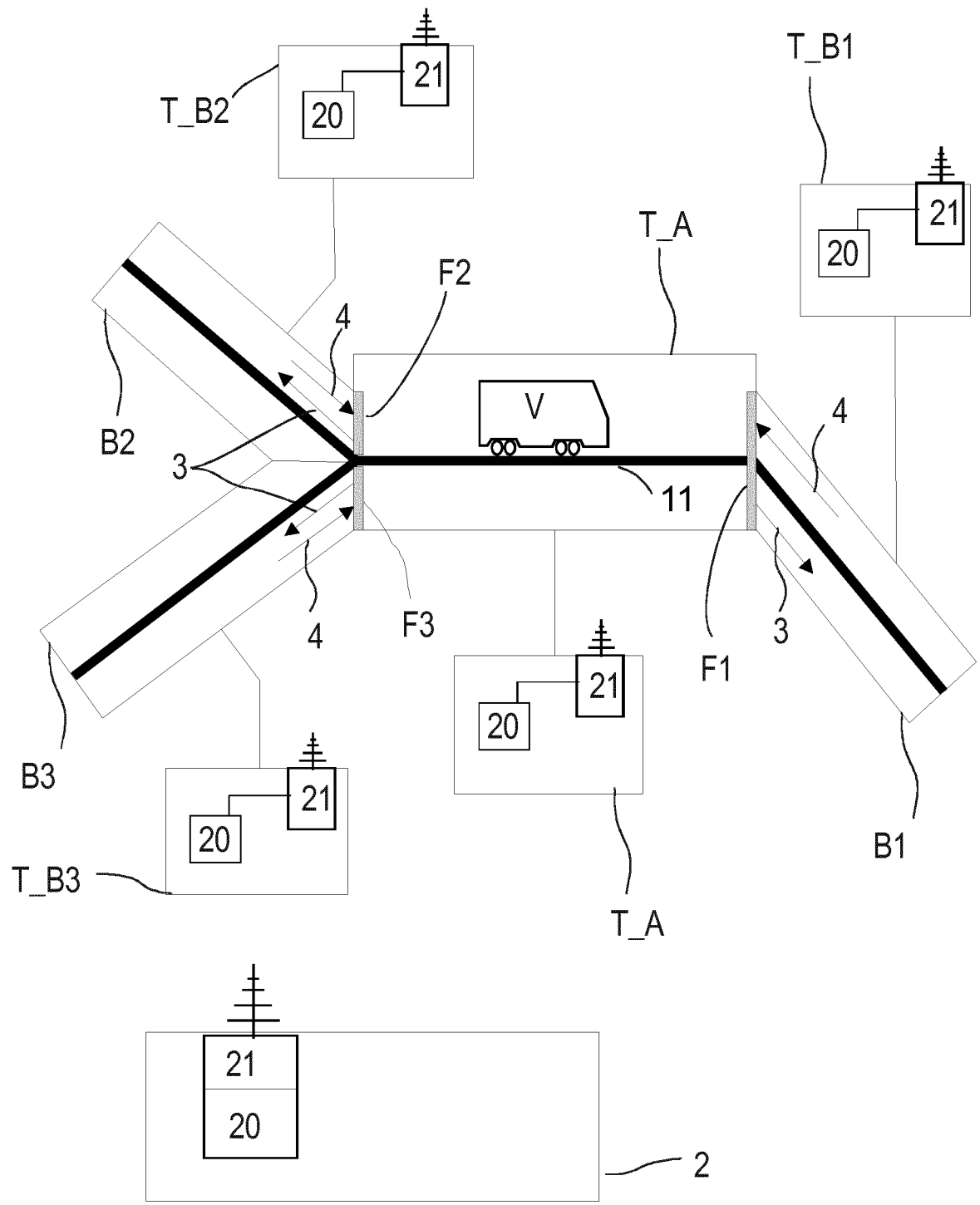

SYSTEM AND METHOD FOR TRACK OCCUPANCY DETERMINATION

BACKGROUND OF THE INVENTION

Field of the Invention

The present invention concerns a system and a method for safely and efficiently determining an occupation state of a track section of a railway network.

The present invention is essentially related to the control of the movement of guided vehicles within a railway network and the issuance of movement authority for a track section by trackside device on the basis of the determination of the occupation state of said track section. "Guided vehicle" refers herein to public transport means such as subways, trains or train subunits, etc., as well as load transporting means such as, for example, freight trains, for which safety is a very important factor and which are guided along a route or railway by at least one rail, in particular by two rails.

Actual rail systems such as the European Rail Traffic Management System (ERTMS)/European Train Control System (ETCS) Level 2 or 3 allow to manage guided vehicle movement authority on the basis of radio signals exchanged between the guided vehicle and trackside devices of a railway network. For example, a fitted guided vehicle (i.e. comprising equipment fitting the guided vehicle for radio-based signaling) comprises devices enabling the determination of its position by reading track-mounted reference beacons and measuring a travelled distance from these reference beacons using on-board odometry. The guided vehicle then reports periodically its position to trackside devices, for example a Radio Block Centre (RBC), and receives movement authority based on its position from the latter.

The trackside device has to determine when, where and under which conditions a movement authority can be issued so that guided vehicle may operate safely. Typically, movement authority is given up to the position of the rear of the next directly preceding guided vehicle or up to the position of a first next downstream trackside obstacle such as an unlocked point, wherein the position of said first next preceding guided vehicle is for instance known from position reports sent by said next directly preceding guided vehicle to the trackside device and the position of the first next downstream trackside obstacle is for instance predefined and stored in a memory of the trackside device or of a centralized control system. Optionally and additionally, information from track vacancy detection systems using techniques based on track circuit occupation might be analyzed by the trackside device to locate guided vehicles along track sections of the railway network and determine if there is no other guided vehicle in front of an incoming guided vehicle. If the track circuit in front of the incoming guided vehicle is proved clear, then the trackside device sends a movement authority (i.e. a permission to proceed with moving forward) to the incoming guided vehicle.

Problems may arise when unfitted guided vehicles are moving on the railway network, or when two or more guided vehicles are occupying the same track circuit at the same time, typically when a short guided vehicle is moving in front or behind another guided vehicle and the trackside device cannot distinguish the two guided vehicles. It is thus difficult to determine the number of guided vehicles that may occupy a track section.

To prevent such situations, different techniques have been developed, usually by comparing the guided vehicle position evaluated by an on-board unit with the status and/or position of another object, such as the status and position of a track vacancy detection system, or the status and position of another track object (e.g. signal, bumper), or the position of another guided vehicle. Such techniques are for instance a "Track Ahead Free" process handled on-board by the driver, wherein said driver shall confirm a free occupancy state of a portion of track located between the head of the guided vehicle and a next track object position, or an automatic Track Ahead Free process usually called "Prove Clear Ahead" (PCA), wherein a movement authority is granted if the distance separating the front of the guided vehicle from the next track section controlled by a track vacancy detection system and for which a movement authority is requested is smaller than the smallest length of guided vehicles operating on the railway network and if the occupancy status of said next track section provided by the track vacancy detection system was in a vacant state, or wherein the guided vehicle position and/or kinematics and/or driving regulations ensure that the smallest guided vehicle cannot be located between the guided vehicle and the next track vacancy detection system. The different techniques used for determining the occupancy of a track section are well-known by the man skilled in the art and does not need further description.

A drawback of said techniques is that the determination of the occupancy state of a track section can only be done if some conditions are satisfied, including usually a condition of proximity with the compared object, and that require a movement of the guided vehicle with at least the two following adverse effects:

a decrease of the level of safety, because said movement of the guided vehicle is realized while the trackside device for checking the occupancy state of the track section is not fully initialized, i.e. the occupancy state of said track section is not yet known;

one has to send a driver into a guided vehicle for the re-initialization trackside device after a failure in order to ensure the safety of its movement until full initialization.

For the above-mentioned reasons, each restart of a previously failed trackside device in charge of the determination of a track section occupancy state is time consuming and requires a careful check of the above-mentioned conditions before being fully initialized and able to deliver movement authority to guided vehicles whose running plan passes through the track section said previously failed trackside device is in charge of.

SUMMARY OF THE INVENTION

An objective of the present invention is to propose a system and a method for safely and efficiently managing the restart of a previously fully initialized trackside device in charge of the delivery of movement authority to guided vehicles for a track section, decreasing therefore the time needed for an initialization process of a trackside device after its failure.

For achieving said objective, the present invention proposes a system and a method for managing the occupancy state of track sections according to the objects of independent claims 1 and 10. Other advantages of the invention are presented in the dependent claims.

This objective is notably achieved by a method for determining the occupancy state of a track section A of a railway network by calculating a subsequent number of guided vehicles occupying said track section A from a number of guided vehicles occupying said track section A that has been previously determined by a trackside device T_A and from information received by said trackside device T_A from at least one, preferentially each, neighboring trackside device T_Bi regarding a number N_E of guided vehicles entering, from said track section A, a directly neighboring track section Bi controlled by said neighboring trackside device T_Bi and/or a number N_L of guided vehicles leaving the directly neighboring track section Bi for entering said track section A, the latter being controlled by the trackside device T_A. Preferentially, the trackside device T_A controls and manages movement authorities for guided vehicles for said track section A, and each neighboring trackside device T_Bi controls and manages movement authorities for guided vehicles for a directly neighboring track section Bi. According to the present invention, a directly neighboring track section Bi is a track section having a boundary with the track section A, so that there is no other track section controlled by another trackside device between the track section A and the directly neighboring track section Bi.

The method according to the present invention comprises in particular:
- a determination of a number N_1 of guided vehicles initially occupying said track section A before starting a period of time P_1. Said determination of the initial number N_1 is realized notably during an initialization of the trackside device T_A. It corresponds to the first determination of the number of guided vehicles occupying the track section A by means of the trackside device T_A. During said initialization, usual methods known by the man skilled in the art might be used for determining the occupancy state of the track section A, i.e. the number of guided vehicles occupying said track section A. Such methods use for instance the knowledge of guided vehicles positions provided by guided vehicle position reports and/or track vacancy detection systems based for example on information reports received by the trackside device T_A from the guided vehicles, beacons information, PCA processes, Track Ahead Free processes, axle counters, etc. The determination of an occupancy state of a track section A by a trackside device T_A at its initialization by using notably a track vacancy detection system is a known process that does not need further description here. As explained below, the present invention concerns the determination of the subsequent number of guided vehicles occupying the track section A once an initial number is already known. According to the present invention, the number N_1, i.e. the initial/first number determined by the trackside device T_A that occurs during its initialization, is determined by known techniques such as by means of a track vacancy detection system and/or from information like position information sent by the guided vehicle to the trackside device and/or to a centralized control system, and preferentially at least one, or in particular each, subsequent number is then determined from the knowledge of the previously determined number according to an iterative process, for instance the "first" subsequent number N_2 might be determined from the knowledge of the number N_1, and/or the next subsequent number N_3 might be determined from the knowledge of the number N_2 previously obtained, etc.
- a determination, by at least one, preferentially each, neighboring trackside device T_Bi that is managing movement authorities for the directly neighboring track section Bi, of the number $N\_E(t=T\_1)$ of guided vehicles having entered the directly neighboring track section Bi from the track section A during a period of time P_1 starting at the time $t=T\_0$ and ending at the time $t=T\_1$, and of the number $N\_L(t=T\_1)$ of guided vehicles having left the latter for entering the track section A during said period of time P_1. According to the present invention, each neighboring trackside device T_Bi is configured for calculating a variation (or flow) of vehicles through its boundary with the track section A. In particular, the numbers $N\_E(t)$ and $N\_L(t)$ are determined from position information reported by the guided vehicle in a position report sent to the trackside device and/or a centralized control system, and/or from other known techniques for safely determining an occupancy state of the track section, such as PCA or the use of track vacancy detection systems;
- a calculation by the trackside device T_A of a subsequent number N_2 of guided vehicles located on said track section A at the end of the period of time P_1 from the number N_1, and at least one of, preferentially both, the numbers $N\_E(t=T\_1)$ and $N\_L(t=T\_1)$ determined by at least one, preferentially each, neighboring trackside device T_Bi. The trackside device T_A is thus able to calculate the number of guided vehicles occupying the track section A it is responsible for from the knowledge, provided by at least one, preferentially each, neighboring trackside device T_Bi, of the number of guided vehicles entering and/or leaving the track section A from each directly neighboring track section.

The present invention also concerns in particular a system for determining said subsequent number N_j+1 of guided vehicles occupying the track section A of a railway network. The system according to the invention comprises:
- a trackside device T_A configured for controlling and managing a movement authority of a guided vehicle for a track section A;
- at least one neighboring trackside device T_Bi, wherein each neighboring trackside device T_Bi is configured for controlling and managing a movement authority for a directly neighboring track section Bi;
- optionally, a centralized control system;

the system being characterized in that the trackside device T_A is configured for calculating the subsequent number N_j+1 of guided vehicles from a number N_j of guided vehicles occupying said track section A previously determined by the trackside device T_A and information received from at least one, preferentially each, neighboring trackside device T_Bi regarding a number N_E of guided vehicles entering, from said track section A, the directly neighboring track section Bi controlled by said neighboring trackside device, and/or a number N_L of guided vehicles leaving the directly neighboring track section Bi for said track section A.

Each trackside device according to the invention, for instance the trackside device T_A and/or the neighboring trackside device T_Bi, comprises a processing unit and a memory for processing and handling information received from other trackside device, and/or from the track vacancy detection system, and/or from the centralized control unit. In particular, the processing unit of the trackside device T_A is configured for calculating the subsequent number N_j+1 of guided vehicles located on said track section A from said numbers N_j, N_E and N_L.

Further aspects and advantages of the present invention will be better understood through the following drawing:

BRIEF DESCRIPTION OF THE SEVERAL VIEWS OF THE DRAWING

FIG. 1 schematic representation of a system for managing a movement authority according to the invention.

DESCRIPTION OF THE INVENTION

FIG. 1 illustrates a preferred embodiment of the system according to the invention, which is in particular configured for implementing an automatic management of movement authority for a guided vehicle V moving on a railway track 11 of a railway network divided in a plurality of sections of track (i.e. portions of railway network), like the track section A and the track sections B1, B2 and B3. A trackside device is responsible for controlling and managing movement authorities of guided vehicles for a track section it is responsible for. For instance, the trackside device T_A controls and manages movement authorities for the track section A, and each neighboring trackside device T_Bi controls and manages the movement authorities of guided vehicles for the directly neighboring track section Bi, with i=1, 2, or 3. Each directly neighboring track section Bi has a boundary F_i with the track section T_A.

Each trackside device according to the invention comprises preferentially a processing unit 20, a memory, and a communication system 21. Optionally, the system according to the invention comprises a centralized control system 2 which is also equipped with at least a processing unit 20, a memory and a communication system 21 for communicating with the trackside devices of the railway network. Said centralized control system 2 is notably responsible for centralizing information received from said trackside devices and guided vehicles of the railway network and for communicating to the latter relevant information. In particular, the system according to the invention comprises a communication network enabling a communication of data between the trackside device T_A, each neighboring trackside device T_Bi and optionally the centralized control system 2.

In particular, a track vacancy detection system comprising for instance a track circuit, or an axle counter, or a zone controller, a beacon, equips each track section A, Bi, and is in charge of a determination of an occupancy state of the track section it equips. Each trackside device T_A, T_Bi is connected to the track vacancy detection system equipping the track section it controls and manages, and receives from said track vacancy detection system information related to the occupancy by guided vehicles of the track section it controls and manages. From said information provided by the track vacancy detection system and optionally from report received from guided vehicles moving on the railway network, and/or information from the centralized control system 2, each trackside device is able to determine the number of guided vehicles occupying the track section it is responsible for. This determination is time consuming and has to be done at least at the initialization of the system, i.e. at the initialization of a trackside device, before delivering the first movement authority to a guided vehicle for the track section it controls and manages. One problem arises then from a failure of a trackside device of the system after initialization of the system. Indeed, in this case, the failed trackside device has to be reinitialized, which is blocking for the guided vehicles moving on the railway network, since no movement authority might be provided until the failed trackside device is fully re-initialized. What has been previously described is the state of the art. The present invention proposes then to determine a subsequent number of guided vehicles occupying a track section according to a new and original way that will be described in more details by taking the preferential embodiment of the system represented in FIG. 1. This new and original way provides notably the advantage of a fast determination of an occupancy state of a track section by a trackside device after failure of the latter, i.e. during its re-initialization.

According to the present invention, the trackside device T_A determines, preferentially automatically, before starting each period of time $P\_j+1$ that starts at time $T\_j$ and ends at time $T\_j+1$, wherein $1 \leq j \leq n$ and $n \geq 2$, a subsequent number $N\_j+1$ of guided vehicles occupying the track section A from a number $N\_j$ of guided vehicles that occupied the track section A at the end of the time period $P\_j$, i.e. the previous time period, and from a number $N\_E(t=T\_j)$ (see arrow 3 in FIG. 1), and/or a number $N\_L(t=T\_j)$, of guided vehicles that have respectively entered a directly neighboring track section Bi from the track section A and left said directly neighboring track section Bi for entering track section A during the period of time $P\_j$.

In particular, the start of at least one, and preferentially of each, period of time $P\_j$ is triggered by the detection of an event by the trackside device T_A, said event being for instance:
  an initialization of the trackside device T_A; and/or
  information reporting a change of the number of guided vehicles occupying the track section A, for instance communicated from at least one of the neighboring trackside devices via the numbers $N\_E(t)$ and/or $N\_L(t)$ or communicated from a report of the centralized control unit (e.g. from an operator); and/or
  a failure of the trackside device T_A requiring its re-initialization;
so that the calculation of each subsequent number continuously takes place at each variation/change of the number of guided vehicles occupying the track section A. Preferentially, each trackside device may continuously update the number of guided vehicles occupying the track section it controls and manages using a known technique such as the track vacancy detection system and/or position information provided by the guided vehicles, and/or PCA techniques, but uses at least once information reporting a change of the number of guided vehicles occupying the track section it is responsible for, wherein said information is reported via at least one of the numbers $N\_E(t)$ and $N\_L(t)$ reporter by a neighboring trackside device.

Before starting a period of time $P\_1$, the trackside device T_A has to be initialized and the number $N\_1$, i.e. the initial number of guided vehicles occupying the track section A, determined. The period of time $P\_1$ is thus the first time period after initialization of the trackside device T_A. According to the present invention, the number $N\_1$ is determined using known processes, such as using a track occupancy detection system. The start of the period of time $T\_1$ might be triggered by the initialization of the trackside device T_A. In particular, said initialization and determination of the number of guided vehicles takes place for each trackside device controlling and managing a track section of the railway network.

Once this number $N\_1$ determined, the trackside device T_A preferentially communicates this number $N\_1$ either to each neighboring trackside device Bi or to the centralized control system 2, for storage in their respective memory. In particular, the trackside device T_A also receives from each neighboring trackside device B_i a number $N_{Bi}\_1$ corresponding to the initial number of guided vehicles occupying the track section Bi and stores said number in a memory.

In particular, each neighboring trackside device T_Bi is configured for determining, during the period of time P_1, i.e. from the start of the period P_1 at the time T_0 until the end of the period of time P_1 at the time T_1, an occupancy state of the directly neighboring track section Bi, wherein determining said occupancy state comprises at least determining in function of the time t the number N_E(t) of guided vehicles entering the directly neighboring track section Bi from the track section A since the time T_0 and the number N_L(t) of guided vehicles leaving the latter for entering the track section A since the time T_0. Preferably, each neighboring trackside device T_Bi continuously updates the trackside device T_A with information regarding the number N_L(t) and/or N_E(t) each time at least one of said number changes. In other words, each neighboring trackside device T_Bi is preferably configured for communicating to the trackside device T_A the number N_L(t) and/or N_E(t) each time at least one of said numbers changes since the beginning of the current period of time, presently P1. In particular, the reception by the trackside device T_A of one of the above-mentioned numbers triggers the end of the current period of time, presently P1, and the start of a next period of time, presently P2. By this way, the number of guided vehicles per track section might be continuously monitored by the trackside device T_A on the basis of information provided by a neighboring trackside device regarding the number of vehicles entering and leaving the neighboring track section, but also and notably on the basis of information that might be directly provided by entering/leaving guided vehicles (notably in the case of automatic PCA), said information being determined for instance from position report sent by guided vehicles, TVD states and exchanged information between the track section (existing function) or input from an operator.

Preferentially, according to the present invention, the trackside device T_A determines also for each of the boundaries F1, F2, F3 of its track section A with the directly neighboring track sections Bi, the number of guided vehicles arriving on the track section A from each of said directly neighboring track section Bi, and the number of vehicles leaving the track section A for entering each of said directly neighboring track sections Bi from the start of each period of time $P_{Bi}\_j$ managed by the neighboring trackside device Bi. Preferentially, the determined numbers are communicated either to the centralized control system 2 or to the corresponding neighboring trackside devices, preferentially each time at least one of said numbers changes, so that each corresponding neighboring trackside device may also implement the method according to the invention and preferentially continuously updates the number of guided vehicles occupying the track section it is responsible for.

Preferentially, the period of time P_1 ends as soon as at least one of the neighboring trackside devices T_Bi detects a change of the number N_E(t) and/or N_L(t) at a time T_1 and communicates to the centralized control system and/or to the trackside device T_A the number N_E(t=T_1) and/or the number N_L(t=T_1) that correspond respectively to the number of guided vehicles that have entered the directly neighboring track section Bi during the period of time P_1 ending at time T_1 and that have left the directly neighboring track section Bi during said period of time P_1. Preferentially, each neighboring trackside device T_Bi communicates, notably at the end of the period of time P_1, to the centralized control system and/or to the trackside device T_A the number N_E(t=T_1) and/or the number N_L(t=T_1). Optionally, at least one neighboring trackside device T_Bi sends back to the trackside device T_A the previously determined number N_1 at the end of the period of time P_1 or in case of a failure of the trackside device T_A during the period of time P_1. Preferentially, the central control system 2 is configured for sending to the trackside device T_A the numbers N_1, N_E(t=T_1), and N_L(t=T_1) at the end of the period P_1.

The trackside device T_A is then configured for determining a subsequent occupancy state of the track section A at the end of the period of time P_1, notably by calculating a subsequent number N_2 of guided vehicles located on said track section A from the number N_1, the numbers N_E(t=T_1) and N_L(t=T_1) which have been previously determined by the neighboring trackside device T_Bi for the period of time P_1, or preferably by each of said neighboring trackside devices T_Bi for said period of time P_1.

Then, for each subsequent period of time P_j with j>1 that starts at a time T_j−1 and ends at time T_j that might be triggered by the detection of said event, the present invention proposes to iteratively proceed according to the following steps:

i. preferentially communicating, notably at the start of said subsequent period of time P_j, the number N_j previously determined by the trackside device T_A to each neighboring trackside device T_Bi and/or to the centralized control system 2;

ii. determining by each neighboring trackside device T_Bi in function of the time the numbers N_E(t) of guided vehicles entering the directly neighboring track section Bi from the track section A since the start of the period of time P_j, and the number N_L(t) of guided vehicles leaving the directly neighboring track section Bi for entering the track section A since said start of the period of time P_j;

iii. communicating at the end of the period of time P_j, the number N_E(t=T_j) and/or N_L(t=T_j) to either the centralized control system 2 and/or the trackside device T_A. Preferentially, each neighboring trackside device T_Bi is configured for detecting which number among N_E(t) and N_L(t) has changed during the period of time P_j and for communicating to the trackside device T_A only the number that has changed. Preferentially, the time T_j is (a) the time at which a failure of the trackside device T_A occurs and is detected, or (b) the time at which at least one of the numbers N_E(t), N_L(t) is different from respectively N_E(t=T_j−1), N_L(t=T_j−1) for at least one of the neighboring trackside devices, or (c) the time at which an information received by the trackside device T_A reports a change of the number of guided vehicles occupying the track section A.

In case (b), preferentially only the neighboring trackside device for which N_E(t) is different from N_E(t=T_j−1) for the first time at time T_j and/or N_L(t=T_j−1) is different from N_L(t) for the first time at time T_j communicates the number among N_E(t=T_j) and N_L(t=T_j) that has changed since t=T_j−1, and optionally the number N_j. Indeed, and in particular, at least one neighboring trackside device B_1 is configured for communicating back the number N_j to the trackside device T_A. Preferentially, in the case of a system according to the invention using a centralized control system 2, the latter communicates at the end of the period of time P_j, the number N_j, the numbers N_E(t=T_j) and N_L(t=T_j) to the trackside device T_A;

iv. determining a subsequent occupancy state N_j+1 of said track section A by means of the trackside device T_A, wherein said determination of the subsequent occupancy state by said trackside device T_A comprises at least calculating at the end of the period of time P_j a subsequent number N_j+1 of guided vehicles located on said track section T_A at the end of the period P_j from the number N_j, and at least one among the number(s) N_E(t=T_j) determined by at least one of neighboring trackside devices T_Bi and/or the number N_L(t=T_j) determined by at least one of the neighboring trackside devices T_Bi. N_j+1 is for instance obtained by using the following formula:

$$N_{j+1} = N_j - \Sigma_{T\_Bi} N\_E(t=T_j) + \Sigma_{T\_Bi} N\_L(t=T_j) \quad \text{Eq. 1}$$

wherein the summation symbol represents the sum over the numbers N_E, respectively N_L, received from each neighboring trackside device T_Bi that has sent said numbers N_E and/or N_L at the end of the period P_j. According to the present invention and preferentially, only the neighboring trackside devices T_Bi which have detected a change in at least one of the numbers N_E(t) and N_L(t) at a time T_j since the beginning of the period P_j communicate the number which has changed to the trackside device T_A or a centralized control system, and in particular only said number that has changed is communicated, said communication triggering the start of the subsequent period P_j+1 and the calculation of the subsequent number N_j+1 by the trackside device T_A, and then the communication of said subsequent number N_j+1 to each neighboring trackside device T_Bi.

Advantageously, the present invention allows a fast re-initialization of the trackside device T_A in case of failure of the latter. Indeed, after a failure of the trackside device T_A at a time t_f falling within a period of time P_z that started at the time T_z−1, wherein 1≤z≤n and n≥2, said period of time P_z automatically terminates at the time T_z=t_f since the failure is in particular an event triggering the start of a new period, and the method comprises:

i. communicating to the trackside device T_A the number N_z, the number N_E(t=t_f) and the number N_L(t=t_f), wherein the above-mentioned numbers are either provided by the centralized control system 2 or by the neighboring trackside device T_Bi, preferentially by each neighboring trackside device T_Bi, to the trackside device T_A, and wherein N_E(t=t_f) and N_L(t=t_f) are respectively the number of guided vehicles having entered the directly neighboring track section Bi from the track section A and left said directly neighboring track section Bi for entering the track section A since the start of the period of time P_z until the failure of the trackside device T_A at the time t_f;

ii. determining an actual occupancy state of said track section T_A by means of the trackside device T_A, wherein said determination of the actual occupancy state by said trackside device T_A comprises at least calculating an actual number N_A=N_z+1 of guided vehicles located on said track section A from the number N_z, the number N_E(t=t_f) determined by each neighboring trackside device T_Bi and the number N_L(t=t_f) determined by each neighboring trackside device T_Bi.

Preferentially, a new movement authority might be delivered to a guided vehicle for the track section A as soon as the following conditions are verified:

said actual number N_A is known;

N_A guided vehicles have transmitted an updated position report indicating their location on said track section A. Said position report is for instance needed for determining the movement authority for a next guided vehicle.

According to this process, the re-initialization of a previously failed trackside device is very fast since the determination of the number of guided vehicles occupying the track section is done on the basis of information provided by each neighboring trackside device. The calculation of a subsequent number of guided vehicles occupying the track section A can then continue as if no failure occurred during the period of time P_z. Indeed, at the end of the latter which corresponds to the start of the next period of time P_z+1, the subsequent number N_z+1=N_A of guided vehicles might be simply obtained by the usual method from N_z, N_E(t=t_f) and N_E(t=t_f).

Starting from a known number of guided vehicles located on the track section A at the start a period of time P_j, the present invention allows thus to evaluate the number of guided vehicles on said track section A at the end of the period of time P_j by addition of the variations of the number of guided vehicles entering/leaving directly adjacent/neighboring track sections. The system according to the invention is preferentially configured for automatically determining the occupancy state of the track section A by calculating each subsequent number N_j+1.

Advantageously, any trackside device of the system according to the invention can thus evaluate at the end of the period of time P_j the number of guided vehicles on the track section it controls and manages without the need to monitor said track section during the period of time P_j by implementing the features described for the trackside T_A. Thus, after restart of a previously failed trackside device in charge of the determination of a track section occupancy state, the number of guided vehicles to be monitored on the track section is directly and rapidly retrieved by the previously failed trackside device from data (i.e. said numbers N_j, N_E(t=t_f) and N_L(t=t_f)) sent by each of its neighboring trackside devices, provided that:

each trackside device sends regularly to each neighboring trackside device the number N_j of monitored guided vehicles it previously determined for the track section it controls and manages;

each trackside device evaluates the numbers N_E(t) and N_L(t) for each of the boundaries of its track section with directly adjacent/neighboring track sections and since each last communicated number N_j with respect to its neighboring trackside device, i.e. from the start of each period P_j, and sends back the number N_j, the numbers N_E(t=T_j), notably only if the latter has changed compared to N_E(t=T_j−1), and N_L(t=T_j), notably only if the latter has changed compared to N_L(t=T_j−1), at the end of the period of time P_j to each neighboring trackside device.

In other words, and preferentially, each trackside device of the system according to the invention combines the features of the trackside device T_A and the features of the neighboring trackside device T_Bi so that each trackside device of the system is able to implement the method according to the invention. Therefore, preferentially, each trackside device of the system according to the invention determines on one hand the number N_j of guided vehicles occupying the track section it is responsible for before starting a period of time P_j, communicates said number N_j to each neighboring trackside device, and calculates the subsequent number N_j+1 from the number N_j, the number N_E(t=T_j) and N_L(t=T_j) as previously described, and on the other hand, determines the number N_E(t) and N_L(t) for each directly neighboring track section and communicates said number to the corresponding trackside device at the end of period of time P_k, said end of time P_k being triggered by the detection of an event by the neighboring trackside device and/or by said corresponding trackside device and/or by a centralized control system and/or by an operator, such an event being for instance a failure of said corresponding trackside device wherein preferentially the end of the failure triggers the end of the period of time P_k, so that said corresponding trackside device is able to calculate the subsequent number N_k+1 for the track section it controls.

Preferentially, each trackside device of the system according to the invention is able to determine, from the number of guided vehicles on the track section it controls and manages and from a position report regularly sent from the guided vehicles, the position of all guided vehicles on its track section, and thus to rapidly deliver a movement authority to vehicles immediately after a restart of the trackside device without a need for a long initialization process as it is the case for prior art techniques. This immediate knowledge of the subsequent number N_j+1 of guided vehicles occupying a track section combined with a localization of said guided vehicles known by guided vehicles onboard units enables in particular an instant delivery of permissive movement authority to said guided vehicles located on said track section.

The invention claimed is:

1. A method for determining a subsequent number N_j+1 of guided vehicles occupying a track section of a railway network, which comprises the steps of:
    calculating the subsequent number N_j+1 of guided vehicles by a trackside device controlling movement authorities for the track section from:
        a number N_j of guided vehicles occupying the track section that has been previously determined by the trackside device; and
        information received from at least one neighboring trackside device regarding:
            a number N_E of guided vehicles entering, from the track section, to a directly neighboring track section controlled by said neighboring trackside device; and/or
            a number N_L of guided vehicles leaving the directly neighboring track section for the track section.

2. The method according to claim 1, wherein for determining the subsequent number N_j+1 from the number N_j of guided vehicles occupying the track section, the track section is controlled by the trackside device, wherein each said directly neighboring track section is controlled by the neighboring trackside device, and wherein 1≤j≤n and n≥2, the method further comprises:
    determining a number N_1 of guided vehicles located on the track section before starting a period of time P_1, wherein the number N_1 is an initial number of guided vehicles occupying the track section; and
    determining, by the at least one neighboring track-side device that is managing movement authorities for the directly neighboring track section, the number N_E (t=T_1) of guided vehicles having entered the directly neighboring track section from the track section during the period of time P_1 starting at a time t=T_0 and ending at a time t=T_1, and the number N_L(t=T_1) of guided vehicles having left the directly neighboring track section for entering the track section during the period of time P_1, and calculating by the trackside device a subsequent number N_2 of guided vehicles located on the track section at the end of the period of time P_1 from the number N_1, the number N_E (t=T_1) and/or N_L(t=T_1) determined by at least one of the neighboring trackside device.

3. The method according to claim 1, which further comprises communicating each said number N_j previously determined to each said neighboring trackside device and/or to a centralized control system.

4. The method according to claim 1, which further comprises communicating at an end of a period of time P_j, the number N_j, and at least one among the numbers N_E (t=T_j) and N_L(t=T_j), to the trackside device.

5. The method according to claim 1, wherein each said neighboring trackside device determines in dependence on time t the number N_E (t) of guided vehicles entering the directly neighboring track section from the track section and the number N_L(t) of guided vehicles leaving the directly neighboring track section for entering in the track section.

6. The method according to claim 5, wherein after a failure of the trackside device at a time t_f falling within a period of time P_z that started at time T_z−1 and shall end at time T_z=t_f, with 1≤z≤n and n≥2, the method comprises:
    communicating to the trackside device a number N_z; the number N_E (t=t_f) and the number N_L (t=t_f);
    calculating by means of the trackside device an actual number N_A of guided vehicles located on the track section from the number N_z, the number N_E (t=t_f) determined by each said neighboring trackside device and the number N_L(t=f) determined by each said neighboring trackside device; and
    determining an occupancy state of the track section from the actual number N_A.

7. The method according to claim 1, wherein for j≥1 and for each period of time P_j starting at a time T_j−1 and ending at time T_j, iteratively proceeding to the following steps in order to determine the number of guided vehicles occupying the track section at an end of the period of time P_j:
    communicating, at a start of the period of time P_j the number N_j to each neighboring trackside device and/or to a centralized control system;
    determining by means of the at least one neighboring trackside device the number N_E (t) of guided vehicles entering the directly neighboring track section from the track section during the period of time P_j and the number N_L(t) of guided vehicles leaving the directly neighboring track section for entering the track section during the period of time P_j;
    communicating to the trackside device at the end of the period of time P_j at least one of the numbers N_E (t=T_j) and N_L(t=T_j) that has been previously determined; and
    calculating at the end of the period of time P_j the number N_j+1 of guided vehicles located on the track section from the number N_j, each said number N_E(t=T_j) that has been communicated by the neighboring trackside device, and each said number N_L(t=T_j) that has been communicated by the neighboring trackside device.

8. The method according to claim 1, wherein the subsequent number N_j+1 of guided vehicles located on the track section, with 1≤j≤n and n≥2, is calculated according to:

$$N_{j+1} = N_j - \sum_{T\_Bi} N\_E(t=T_j) + \sum_{T\_Bi} N_{L(t=T_j)}$$

where T_Bi is the at least one neighboring trackside device.

9. The method according to claim 1, wherein each step of the method is automatically performed.

10. A system for determining a subsequent number N_j+1 of guided vehicles occupying a track section of a railway network, the system comprising:
- a trackside device configured for controlling and managing a movement authority of a guided vehicle for the track section;
- at least one neighboring trackside device, each said neighboring trackside device configured for controlling and managing a movement authority for a directly neighboring track section; and
- said trackside device is configured for calculating the subsequent number N_j+1 of guided vehicles from a number N_j of guided vehicles occupying the track section previously determined by said trackside device and information received from said at least one neighboring trackside device regarding a number N_E of guided vehicles entering, from said track section, the directly neighboring track section controlled by said neighboring trackside device and/or a number N_L of guided vehicles leaving the directly neighboring track section for the track section.

11. The system according to claim 10,
wherein the system is configured for determining, at an end of a period of time P_j, starting at a time T_j−1 and ending at a time T_j, with 1≤j≤n and n≥2, the subsequent number N_j+1 of guided vehicles occupying the track section of the railway network;
wherein said trackside device is configured for determining, at the end of each period of time P_j, the subsequent number N_j+1 of guided vehicles located on the track section;
wherein each said neighboring trackside device is configured for determining during the period of time P_j, the number N_E (t) of guided vehicles entering in dependence on a time t to the directly neighboring track section from the track section during the period of time P_j, and the number N_L(t) of guided vehicles leaving in dependence on the time t of the directly neighboring track section for entering the track section during the period of time P_j, each said neighboring trackside device being further configured for communicating at least one of the numbers N_E(t=T_j) and N_L(t=T_j) to said trackside device;
further comprising a centralized control system;
further comprising a communication network enabling a communication of data between said trackside device, each said neighboring trackside device and said centralized control system;
wherein the system being further characterized in that for each said period of time P_j:
said trackside device is configured for calculating the subsequent number N_j+1 of guided vehicles located on the track section at the end of the period of time P_j from the initial number N_j of guided vehicles occupying the track section at the start of the period of time P_j, and at least one of the numbers N_E (t=T_j) and N_L (t=T_j).

12. The system according to claim 11, wherein said track-side device has a processing unit configured for calculating the subsequent number N_j+1 of guided vehicles located on the track section at the end of the period of time P_j by using the following formula:

$N\_j+1=N\_j-\Sigma_{T\_Bi}N\_E(t=T\_j)+\Sigma_{T\_Bi}N\_L(t=T\_j)$ where T_Bi is the at least one neighboring trackside device.

13. The system according to claim 11, wherein each said neighboring trackside device is configured for determining in dependence on the time t and from the start of each said period of time P_j, the number N_E (t) of guided vehicles entering said directly neighboring track section from said track section and the number N_L(t) of guided vehicles leaving the directly neighboring track section for entering the track section, and for detecting a change in at least one of the numbers N_E (t) and N_L(t) at a time T_j, the change triggering a start of a subsequent period of time P_j+1 by said trackside device through communication by said neighboring trackside device of each number among N_E (t) and N_L(t) for which the change at the time T_j has been detected.

14. The system according to claim 11, wherein after failure of said trackside device at a time t_f falling within a period of time P_z that started at a time T_z-1, with 1≤z≤n and n≥2, each neighboring trackside device is configured for communicating to said trackside device a number N_z, the number N_E (t=t_f) and the number N_L(t=tf), and said trackside device is configured for calculating an actual number N_A of guided vehicles located on said track section from the number N_z, the number N_E (t=t_f) provided by each said neighboring trackside device and the number N_L(t=t_f) provided by each said neighboring trackside device.

15. The system according to claim 10, wherein said trackside device is configured for using a track vacancy detection system and/or a PCA method and/or guided vehicle position report and/or information related to a position of the guided vehicles for determining the number N_j with j=1 of guided vehicles initially located on said track section before starting the period of time P_1.

* * * * *